United States Patent [19]
Muehlberger et al.

[11] Patent Number: 6,032,859
[45] Date of Patent: Mar. 7, 2000

[54] METHOD FOR PROCESSING DEBIT PURCHASE TRANSACTIONS USING A COUNTER-TOP TERMINAL SYSTEM

[75] Inventors: Karl Muehlberger, Lakeland; Michael Hughes, St. Petersburg Beach, both of Fla.

[73] Assignee: New View Technologies, Inc., Irvine, Calif.

[21] Appl. No.: 08/929,993

[22] Filed: Sep. 15, 1997

Related U.S. Application Data

[60] Provisional application No. 60/025,281, Sep. 18, 1996, and provisional application No. 60/033,153, Dec. 13, 1996.

[51] Int. Cl.[7] ..................................................... G06K 7/08
[52] U.S. Cl. ........................... 235/449; 235/379; 235/380
[58] Field of Search ..................................... 235/449, 379, 235/380, 381, 375, 487; 340/825.34

[56] References Cited

U.S. PATENT DOCUMENTS

| | | | |
|---|---|---|---|
| 4,247,759 | 1/1981 | Yuris et al. | 235/381 |
| 4,334,307 | 6/1982 | Bourgeois et al. | 371/16 |
| 4,439,636 | 3/1984 | Newkirk et al. | 179/7.1 R |
| 4,528,643 | 7/1985 | Freeny, Jr. | 364/900 |
| 4,577,061 | 3/1986 | Katzeff et al. | 340/825.35 X |
| 4,625,276 | 11/1986 | Benton et al. | 235/379 X |
| 4,677,565 | 6/1987 | Ogaki et al. | 235/381 X |
| 4,706,275 | 11/1987 | Kamil | 379/144 |
| 4,877,947 | 10/1989 | Mori | 235/381 |
| 4,879,744 | 11/1989 | Tasaki et al. | 235/380 X |
| 4,884,212 | 11/1989 | Stutsman | 364/479 |
| 4,951,308 | 8/1990 | Bishop et al. | 235/381 X |
| 5,068,891 | 11/1991 | Marshall | 379/91 |
| 5,101,098 | 3/1992 | Naito | 235/475 |
| 5,138,650 | 8/1992 | Stahl et al. | 379/114 X |
| 5,146,067 | 9/1992 | Sloan et al. | 235/381 |
| 5,155,342 | 10/1992 | Urano | 235/380 |
| 5,163,086 | 11/1992 | Ahearn et al. | 379/91 |
| 5,192,947 | 3/1993 | Neustein | 235/380 X |
| 5,220,593 | 6/1993 | Zicker et al. | 379/59 |
| 5,221,838 | 6/1993 | Gutman et al. | 235/379 |

(List continued on next page.)

FOREIGN PATENT DOCUMENTS

| | | |
|---|---|---|
| 0 397 512 A2 | 11/1990 | European Pat. Off. . |
| 2-238593 | 9/1990 | Japan . |
| 2-278495 | 11/1990 | Japan . |
| 3-100791 | 4/1991 | Japan . |
| 4-165588 | 6/1992 | Japan . |
| 94/10649 | 5/1994 | WIPO . |

*Primary Examiner*—Michael G Lee
*Attorney, Agent, or Firm*—Allen, Dyer, Dopplet, Milbrath & Gilchrist, P.A.

[57] ABSTRACT

A customer operated counter-top terminal system activates various debit card transactions, provides secure communications with a host computer database, and issues a decrypted authorization code to the customer. The system consists of a main terminal unit with an alphanumeric display. The main terminal unit carries a CPU, memory, and all interface devices, including a keypad for the entry of Personal Identification Numbers (PIN), plus programmable function keys and a swipe reader for reading various cards. The main terminal unit further includes a printer for printing receipts for use by a customer and retailer. The system also includes a remote hand-held keyboard having a keyboard display, typically to be held by a clerk for providing a level of privacy desirable to the customer. The system permits processing services to merchants, allowing them to accept all credit and ATM cards for the purchase of goods or services provided by their establishment, thus providing the advantage of a guaranteed payment for the merchant.

38 Claims, 6 Drawing Sheets

U.S. PATENT DOCUMENTS

| | | | |
|---|---|---|---|
| 5,225,666 | 7/1993 | Amarena et al. | 235/476 |
| 5,264,689 | 11/1993 | Maes et al. | 235/492 |
| 5,265,155 | 11/1993 | Castro | 379/112 |
| 5,266,782 | 11/1993 | Alanärä et al. | 235/380 |
| 5,272,320 | 12/1993 | Hakamada | 235/380 |
| 5,285,382 | 2/1994 | Muehlberger | 235/380 X |
| 5,327,482 | 7/1994 | Yamamoto | 379/61 |
| 5,334,821 | 8/1994 | Campo et al. | 235/380 |
| 5,340,969 | 8/1994 | Cox | 235/381 |
| 5,352,876 | 10/1994 | Watanabe et al. | 235/381 |
| 5,359,182 | 10/1994 | Schilling | 235/380 |
| 5,409,092 | 4/1995 | Itako et al. | 235/381 X |
| 5,438,186 | 8/1995 | Nair et al. | 235/449 |
| 5,442,567 | 8/1995 | Small | 235/381 X |
| 5,477,038 | 12/1995 | Levine et al. | 235/380 |
| 5,504,808 | 4/1996 | Hamrick, Jr. | 379/114 X |
| 5,511,114 | 4/1996 | Stinson | 235/380 X |
| 5,513,117 | 4/1996 | Small | 235/381 X |
| 5,814,798 | 9/1998 | Zancho | 235/380 |
| 5,859,419 | 1/1999 | Wynn | 235/487 |

METHOD FOR PROCESSING DEBIT PURCHASE TRANSACTIONS USING A COUNTER-TOP TERMINAL SYSTEM

CROSS-REFERENCE TO RELATED PATENT APPLICATION

This application is related to provisional applications having Ser. No. 60/025,281, filed Sep. 18, 1996, and Ser. No. 60/033,153, filed Dec. 13, 1996, commonly owned with the present invention.

BACKGROUND OF THE INVENTION

1. Field of Invention

The present invention relates generally to an system and method for telephone services, and more particularly to debit card sales transactions and to the activation of debit cards by a customer for point-of-sale purchases including cellular phone purchases and activation of same.

2. Background Art

The prepaid phone card industry has been established for over twenty (20) years and in Europe alone is a nine billion dollar industry. In just a few years in the United States, the industry has grown to over one billion dollars in revenue with reliable market projections of ten billion by the year 2000. The market includes all types of retail establishments with large foot traffic, the hospitality industry, hospitals, universities and membership clubs such as the YMCA and AAA.

There is a need in the retail industry to provide an inexpensive way of providing purchasing options to customers without the need for high capital investment by the retailer. Further, there is a need to provide alternatives to credit card or check use for the customer for his payment of goods and services without the concern for fraud or excessive service costs. There is a particular need in the smaller specialty stores which number 2.7 million of which only 60,000 have point-of-sale (POS) debit capability. By way of example, these stores typically only offer credit card and cash payment options. In the United States, networks have a card base of 224 million ATM card holders. Of these card holders, 80 million do not have credit cards. In 1993, there were 386 million POS debit transactions. In 1994, there were 614 million transactions. In 1995, there were 918 million transactions. The industry is growing at approximately 50% on an annual basis, as projected in Faulkner and Grey Card Industry Directory, 1996. Canada had a 90% increase in POS debit sales from 1994 to 1995. The industry is expected to increase 50% a year over the next 10 years. The present invention satisfies these needs.

SUMMARY OF THE INVENTION

In view of the foregoing background, it is therefore an object of the present invention to provide a counter-top credit and ATM transaction card terminal for the purchase of goods and services. It is further an object to provide a capability for phone card activation, customer frequency programs, check guarantee and prepaid cellular time activation.

A customer operated counter-top terminal system activates various debit card transactions, provides secure communications with a host computer database, and issues a decrypted authorization code to the customer. The counter-top terminal system useful with phone cards, by way of example, is herein presented. Unlike current vending machines, this terminal does not dispense any merchandise or cards, but enables the clerk to activate debit cards sold elsewhere in his store. It is also capable of performing ATM transactions for the purchase of other merchandise. Another feature of the system is the activation of debit card cellular phones and cellular phone accounts. Yet another application is for prepaid debit systems.

Processing services to merchants will allow them to accept all credit and ATM cards for the purchase of goods or services provided by that particular location. The advantage to the merchant is that POS debit is guaranteed payment, same as cash. Unlike credit cards, there is no possibility of charge-backs and the merchant's return policy still applies. There is also a cost advantage to the merchant. To accept a credit card, the merchant pays approximately 3% of the purchase price. If ATM is used, the fee to the merchant is a flat low cost. For example, on a $100 purchase, the merchant could pay $3 to accept a credit card, but only 40–50 cents to accept an ATM card.

BRIEF DESCRIPTION OF THE DRAWINGS

Preferred embodiments of the present invention will best be understood by referring to the following detailed description when read in conjunction with the accompanying drawings, wherein.

DETAILED DESCRIPTION OF THE PREFERRED EMBODIMENTS

The present invention will now be described more fully herein after with reference to the accompanying drawings, in which preferred embodiments of the invention are shown. This invention may, however, be embodied in many different forms and should not be construed as limited by the embodiments set forth herein. Rather, these embodiments are provided so that this disclosure will be thorough and complete, and will fully convey the scope of the invention to those skilled in the art. Like numbers refer to like elements throughout.

The System

Figure 1:
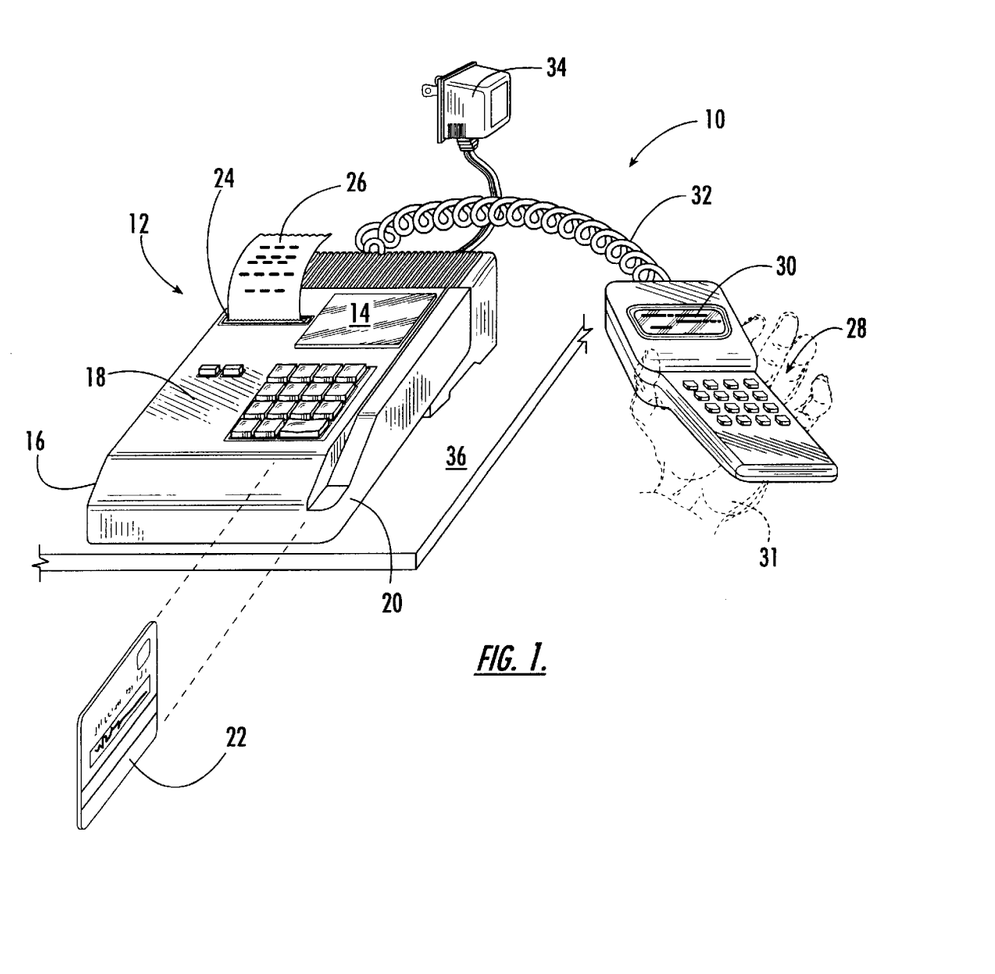
FIG. 1 is a perspective view of one embodiment of a debit counter-top terminal of the present invention.

With reference now to FIG. 1, a system 10 of the present invention consists of a main terminal unit 12 with an alphanumeric display 14. The main terminal unit 12 comprises a housing 16 wherein a CPU, memory, and all interface devices are carried therein. The housing 16 also carries a keypad 18 for the entry of Personal Identification Numbers (PIN), plus programmable function keys and a swipe reader 20 for reading cards 22. The swipe reader 20 will read standard magnetically encoded cards or alternatively, bar coded and/or optical character recognition (OCR) coded stock. A feature for reading smart cards (chip based card memory) can also be accommodated. In a preferred embodiment, the main terminal unit 12 includes a printer 24 carried by the housing 16 for printing receipts 26, by way of example. In the alternative, the printer 24 can be separate from the unit 12. The printer 24 can be either an impact or matrix device or a thermal unit with the ability to print duplicate receipts.

The system 10 further includes a remote hand-held keyboard 28 having a keyboard display 30, typically to be held by a clerk 31 away from where the customer who operates the terminal unit 12, thus providing a level of privacy desirable to the customer. The keyboard 28 is attached and communicates with the terminal unit 12 through a coiled electrical cord 32 for providing access and for entering transaction amounts along with other relevant instructions, as will later be described herein. In a preferred embodiment, power is supplied to the main terminal unit 12 through standard plug-in transformer 34, installed remotely at any convenient wall outlet.

By way of example, and with reference again to FIG. 1, the system 10 is placed on a checkout counter 36 of a retail location, conveniently accessible by the customers to swipe their cards 22 and enter their PIN in privacy. The main terminal unit 12 of the system 10 is compact, taking up only 7 inches×8 inches of counter space on the counter 36, typically.

In Operation

Figure 2:
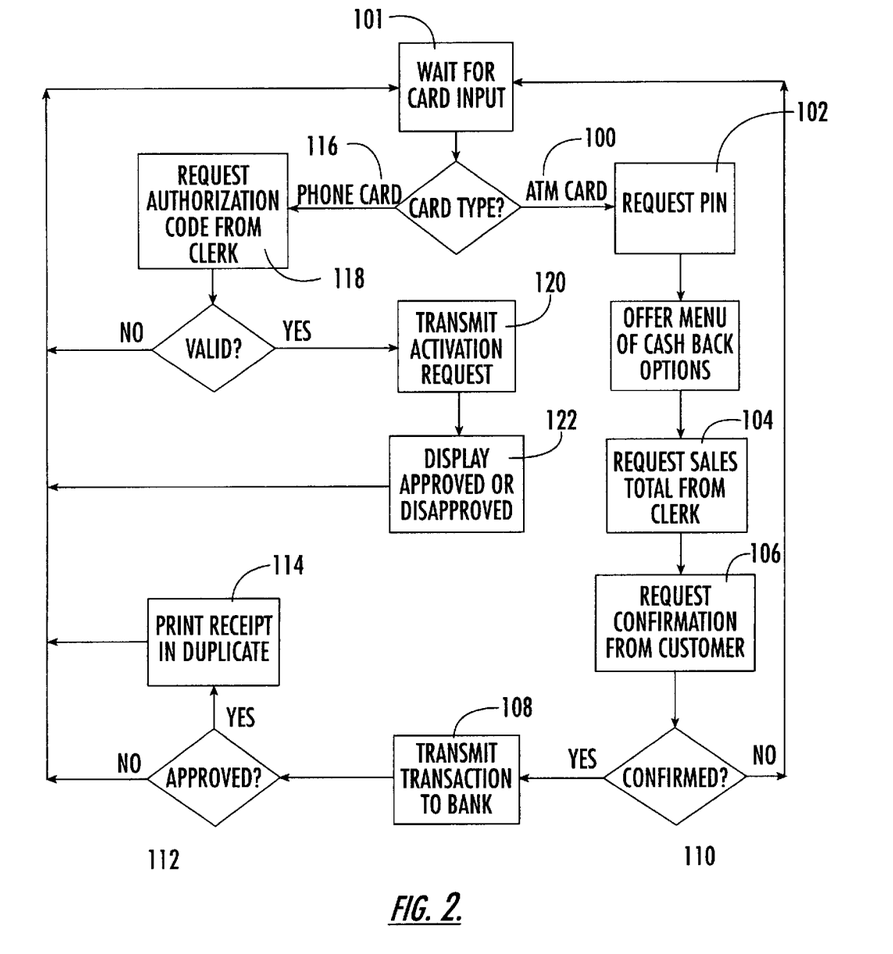
FIG. 2 is a flow chart of a card processor, main loop function, illustrating a flow of information for a phone card activation.

By way of example, and as illustrated with reference to FIG. 2, ATM/Debit transactions 100 are performed in a manner that is familiar to the customer using their ATM or debit card. The customer selects a product, takes it to the sales counter for checkout, then as illustrated with reference to FIG. 2 provides input, by way of example, by swiping 101 the ATM/Debit card through the card reader 20 of the terminal unit 12 described earlier with reference to FIG. 1. The display 14 of the terminal unit 12 will prompt 102 the user to enter the PIN. The PIN is entered by the customer. The clerk proceeds by entering the amount for a given transaction 104, the customer will have the option to confirm 106, then the terminal unit 12 dials the electronic debit processor 108, such as a bank after request has been confirmed 110, transmits the transaction and upon approval 112 prints 114 the receipt 26 described earlier with reference to FIG. 1. The terminal unit 12 will be programmed to transmit a monetary amount, price, and if desired, a pre-selected service-unit value for use in a particular establishment. Typically, the clerk separates the receipt 26, it being of a duplicate form, gives one to the customer and keeps one for the cash register. This concludes the transaction.

An additional feature includes a capability of receiving cash back from the store. In this case the customer tells the clerk whichever amount to add for the cash payout to the total before requesting approval. This amount will then be handed back in cash besides the selected merchandise after approval.

For phone card transactions 116, reference is again made to FIG. 2. Due to a high loss rate and the need to reduce up front cash inventory, merchants and operators are looking for ways to efficiently sell Phone Debit cards. The present invention provides for a method whereby card stock in a store has no real value and only upon sale of the debit card 22 will an account be created and activated to either a pre-printed amount or any designated amount that the customer chooses. By way of example, the customer selects a Phone Debit Card from a shelf display within the store and takes it to the clerk. If the card has a pre-printed amount on it, the clerk will ask for payment by the customer. The customer can pay in either cash, ATM/Debit Card or credit card. If any "cashless" method of payment is selected it will be processed first in the way described above. Once the amount is authorized or the cash collected, the customer or clerk can swipe 101 the phone card through the reader to read the encoded account number. The cards 22 are typically equipped with a magnetic stripe similar to credit cards which hold the account number, but optionally they can be printed with a bar code or other optically recognizable characters. Newer technologies such as the smart card interface to read chip based card memory are also part of the design. Depending on the type of reader in the terminal either method of reading can be accommodated. After the Phone Debit Card is read and the collected amount is entered and confirmed by the clerk with an authorization number 118, the main unit transmits a card number, its terminal ID number and the amount to the appropriate phone card switch or provider. The switch responds by updating its database with this new information, thereby making the account active 120 and sending back a control code which is printed on the receipt as a receipt number confirming the transaction and providing the customer with a reference number in case of difficulties in the use of the card 122. The card is then active and the customer can use it within seconds after leaving the checkout counter.

Figure 3:
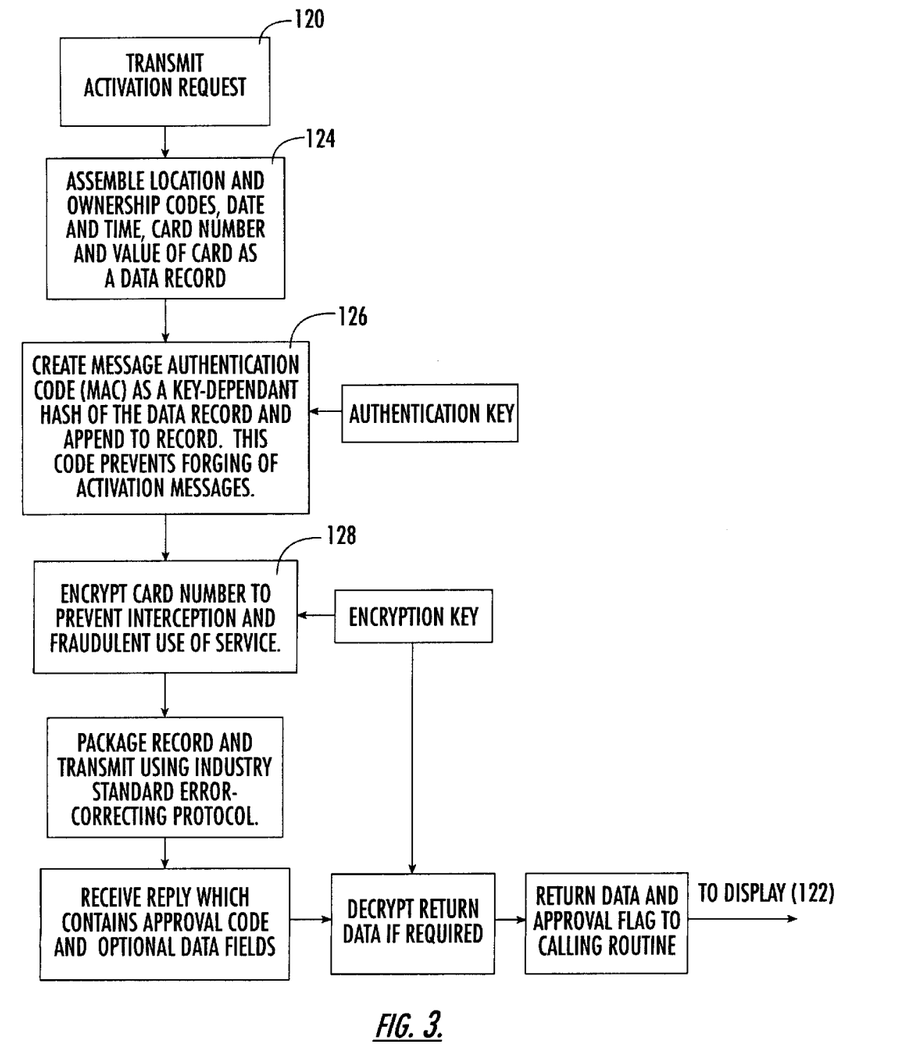
FIG. 3 is a flow chart of a transmit request activation function of FIG. 2 illustrating terminal software operation.

The communications protocol used to call the phone card switch uses unique encoding algorithms to prevent fraudulent use of the system, as illustrated with reference to FIG. 3. Once the activation request is transmitted 120, information is assembled 124 including ownership codes, date and time of transaction, card number and the value of the card, by way of example. A message authorization code is created 126 for use in preventing forging of activation messages. In addition, a card number is encrypted 128 to prevent fraudulent use of the services available. The activating message incorporates a cryptographic signature code derived from the contents of the message and a key shared by the terminal unit 12 and processor of the system 10. The code, by way of example, serves to authenticate the source of the message so that the correct merchant/retailer can be billed for the services rendered, and further, unauthorized persons can not steal service by entering false messages into the system 10.

If difficulties in the first time use are experienced, a toll free number is printed on the card. The customer can call this toll free number and is prompted automatically for various entries, including the receipt number. If the problem cannot be resolved by the entries into the automated system, an operator will take over the call and resolve the problem verbally.

Figure 4:
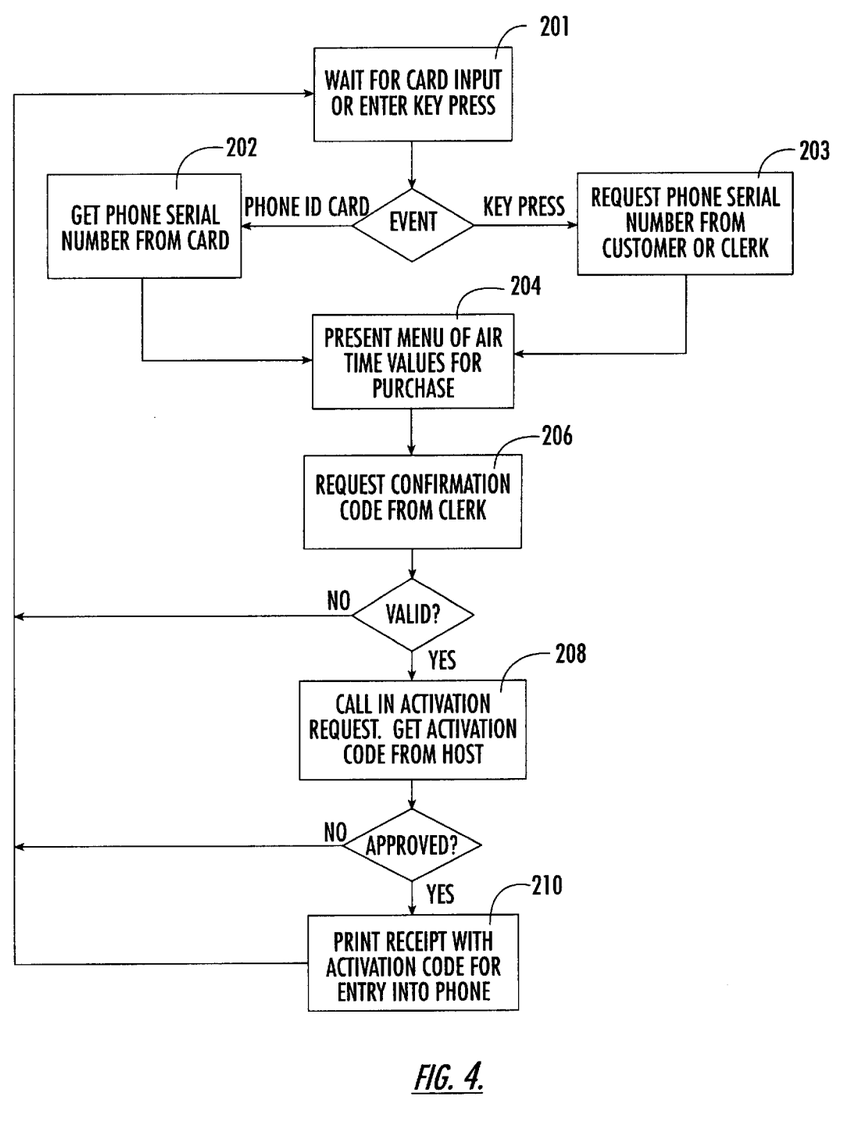
FIG. 4 is a flow chart of a cellular telephone activation function of the present invention.

In order to service the growing cellular debit phone market, the system 10 allows the purchase and activation of cellular styled phones. A cellular phone switch has records of an electronic serial number (ESN) for each of its debit phones. This ESN is combined with other data, most notably the account balance. Every time a phone is used the air time is deducted from the balance until such time when the account becomes depleted. The user of the phone has to buy in advance additional air time in order to use the phone again. Similarly, a user with a new phone has to buy some initial air time to get service. In actual operation the systems work as follows:

As illustrated with reference to FIG. 4, for a cellular activation, the user, provides input, again by way of example, by swiping 201 an ID card that, in a preferred embodiment of the present invention, is received 202 with the Cellular Debit Phone, or in an alternative, enters 203 the ID number on the keypad. Then the system 10, earlier described with reference to FIG. 1, prompts 204 to select the desired air time. The user makes the selection, the clerk is prompted to collect the amount and confirm it by entering an authorization 206 code on the remote keypad. The collection of the money is the same as described earlier with reference to FIG. 2. Once the clerk has completed the entry the system 10 will call 208 the cellular switch with the ESN for the selected cellular telephone, its terminal number and the air time selection. The cellular switch updates its database and sends back a confirmation code 210 which is printed on the receipt for use as a reference number in case of difficulties. The user can use this number to identify this particular transaction when calling Customer service.

Figure 5:
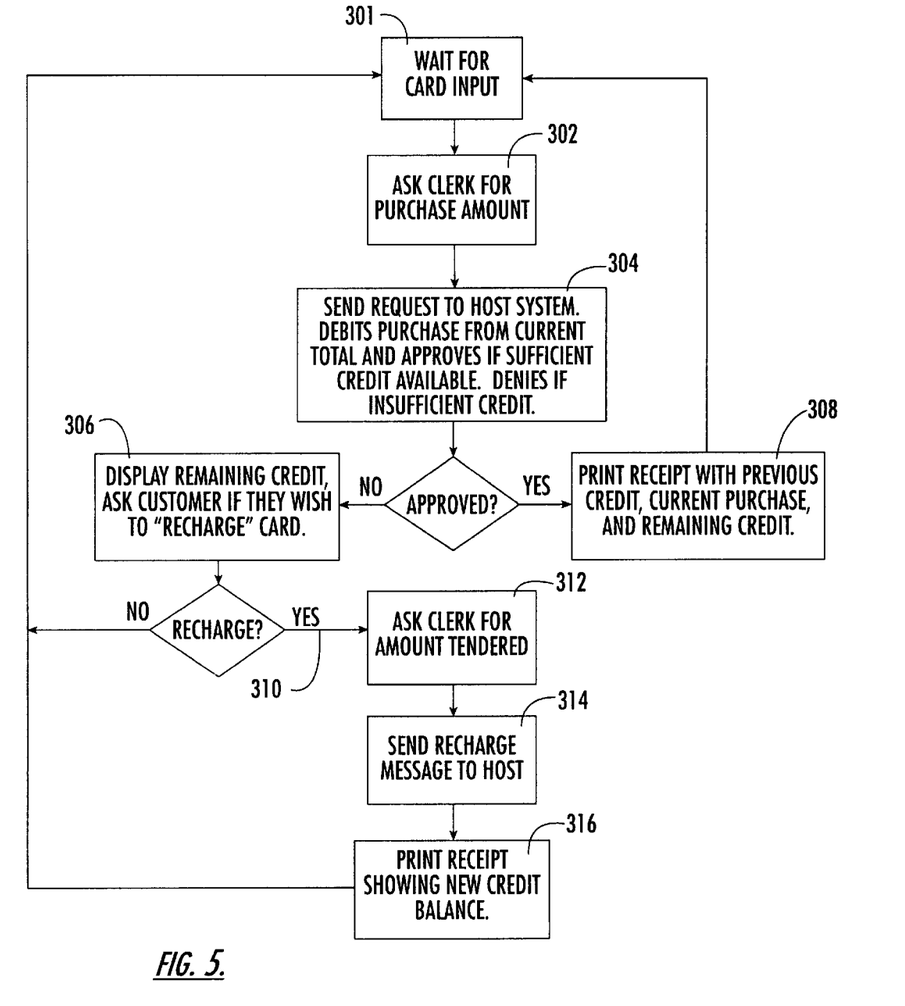
FIG. 5 is a flow chart of a purchase debit card function of the present invention.

By way of further example for prepaid debit transactions, reference is made to FIG. 5, for an alternate use desirable for applications in fast food restaurants and cafeterias where the system 10 operates as a debit collector. During use, a customer purchases a debit card having a certain value, either over the counter with cash, using an ATM or credit card as earlier described, or from a debit card vending machine. The card has intrinsic value which is debited every time a purchase is made. As illustrated with reference to FIG. 5, the debit function occurs every time card input is provided, by way of example herein, when the card is swiped 301 through the terminal 12 described earlier with reference to FIG. 1, an amount is entered 302 and the terminal 12 calls a host 304. The host keeps a record of the account balances. Alternatively in applications using smart cards (chip cards), the balance is kept on the card and the terminal will call the host only in batch mode to transfer all collected activity rather than for each individual transaction. The card can also be increased in value, recharged 306, as earlier described, once the balance is depleted or is insufficient for the purchase. In addition, receipts are printed 308 showing a previous credit balance, the current purchase, and any remaining credit. If the card is to be recharged 310, the clerk receives the designated amount of added value and is prompted to enter 312 the amount into the system 10 as earlier described, which system transmits 314 the value to the host computer. A receipt is printed 316 showing the new credit balance.

Consider, by way of example, a customized debit card program satisfying an existing need in and for educational institutions, herein named a "Gold Card Program." This debit program provides for school and college students having their parents, as an example, prepay for their breakfastlunch/snacks without having to concerned about the student taking money with them everyday. The parents or student purchases (either with cash or with an ATM Debit card) a stored-value debit card from a prepaid dispenser such as that described in U.S. Patent to Muehlberger et al. having Ser. No. 08/479,705 for a Telephone Dispenser and Method. Such a dispenser is located in a convenient place in a retail shop or restaurant of convenience. This card can only be used at the designated retailer and the value is reduced as purchases are made.

The retailer's debit system can be easily customized for the implementation of a retailer's program. Once the customer has made a purchase, they can use their prepaid card which is swiped through the desktop terminal which is connected via a modem line to a host computer which would deduct the purchase from the balance and keep a running total. The card can be recharged at a card dispenser at any time.

Consider the following advantages:

Cards are purchased by cash or ATM Debit card. Therefore are retailer has the money up front.

The card could be tied into specific marketing promotions.

The retailer has given their customers an alternative method of payment by using ATM cards at the Dispenser. As the customer is purchasing a $10/$20 or higher value card, there is only a one-time charge for the ATM processing instead of an ATM processing charge for each time the customer makes a purchase.

The dispenser, referred to above by way of example, can distribute different card values.

The card could also be loaded with calling card time.

The retailer would be the first company to offer its target market a prepaid debit system which would certainly be a status symbol and would encourage sales.

The following are advantages for the customer:

Card could be purchased as a Gift Certificate.

Security for the student as no cash is required.

Free telephone time on the card is case of an emergency.

Students could budget purchases according to the card value.

Calling card portion of the debit card could allow different prompts which could be used for promotions or for information such as:

the nearest retailer's location opening and closing times job opportunities information on the retailer's charitable organization.

The "gold card" program, by way of example, will operate as follows:

1. One large dispensing machine offering six different value gold cards to be placed in a dining area of each restaurant.
2. Card Swipe Terminal to be placed at every register.
3. All dining room dispensing machines and register terminals will be set to report to the host system.
4. Customer purchases a gold card from the large dining room dispensing machine using either cash or ATM card. Dispenser calls host and activates the gold card for the amount of purchase.
5. Gold card will be good for purchases in the restaurant or for long distance calls.
6. After the card purchase, customer goes to cash register to place order. Clerk rings up order and customer presents his Gold Card for payment.
7. Clerk swipes card through register terminal. Register terminal calls host. Host checks the card value against the original card purchase amount. Host then deducts current purchase and sends back balance remaining which is printed out on customer receipt.
8. If customer uses card for a long distance call, customer enters an 800 number. A PIN from the back of the card which connects customer to host asks customer for destination number, computes per minute cost of the call and informs customer how many minutes he has left based upon the dollar balance on his Gold Card.
9. In order to add value (recharge) to the card, customer returns to large dining room dispensing machine and again uses either cash or ATM card to add additional value to his existing card.
10. The potential revenue streams are as follows:
    a. Sale or lease or large dispensing machines and registered terminals;
    b. Route service and machine maintenance fees;
    c. Profit from long distance calls made using the card;
    d. Transaction fees for the use of ATM cards to purchase the Gold Card; and
    e. Transaction fees for authorization of food purchases.

An alternate use of the counter-top terminal includes the use of the card as a stored value unit as well as a phone debit card. The marketing premise behind this application is to offer locations which are not permitted by reasons of location, close proximity to an already-established competitor, etc., to offer or sell telephone debit cards. This location would simply sell the card as a debit card to pay for services offered in its location (e.g., haircuts, canned fruit, by way of example) but the card can also be used by the customer at any phone as a phone debit card.

Figure 6:
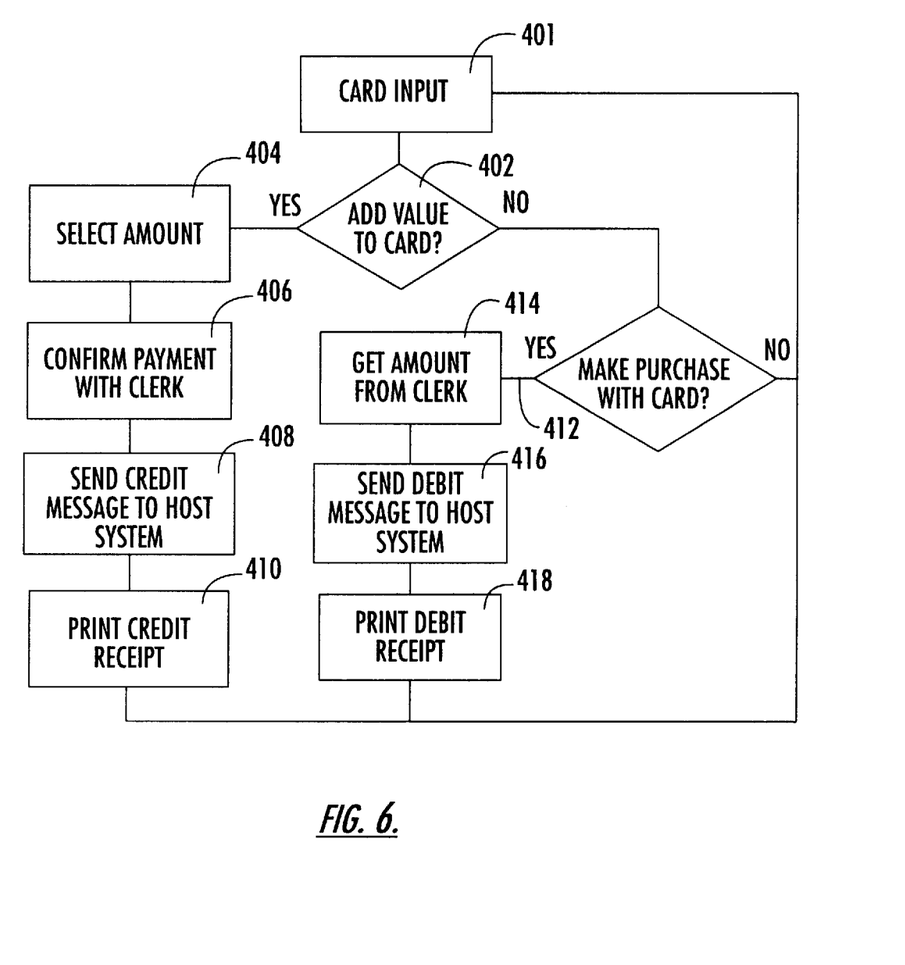
FIG. 6 is a flow chart of an alternate purchase debit process of the present invention.

Thus, the card is now serving a dual purpose. The flow chart of FIG. 6 outlines the debit process in more detail. The use as a phone debit card is unchanged and is as described earlier with reference to FIGS. 2–5. A card is swiped 401 by the customer. A decision 402 is made whether to add value to the card or use existing balance. If value is to be added, an amount is selected 404, payment is made to the clerk wherein the clerk confirms that payment has been made 406. A credit message is sent 408 to the host computer wherein a credit receipt is generated and printed 410 for the customer using the system as earlier described with reference to FIG. 1. If no value is to be added to the card and a purchase is to be made 412, the clerk enters the amount of the purchase 414 and activates the system for transmitting 416 to the host computer. A debit receipt is then generated 418 indicating the value of the transaction. Since the host processor receives the data from the card from the counter-top terminal system 10 or a pay telephone, it can then decide, based upon the input from the terminal operator, whether to treat the charge as a straight debit 416 (for the purchase of goods and services) or as a phone debit application.

Performing a debit card function, the system 10 allows prepaid telephone cards to be used for other purchases at the point of sale terminal. That is, they can also be used as general debit cards up to the amount currently on the card and can be "recharged" for either telephone or general purchase use. The same host system is used to control the use of the card in either case.

Accordingly, many modifications and other embodiments of the invention will come to mind of one skilled in the art having the benefit of the teachings presented in the foregoing descriptions and the associated drawings. Therefore, it is to be understood that the invention is not to be limited to the specific embodiments disclosed or the operations herein presented by way of example, and that modifications and embodiments are intended to be included within the scope of the appended claims.

That which is claimed is:

1. A method for processing debit purchase transactions, the method comprising the steps of:

providing a counter-top terminal having telecommunications means operable with a computer, at least one keypad for data entry to the computer, a display responsive to the computer, and a card reader communicating with the computer for modifying purchasing value of a card in response to card use;

entering transaction data to the computer through keypad data entry;

reading a debit styled card through the card reader for providing card data to the computer;

entering a customer authorization code for authorizing access to a customer data base of a host data processor:

entering a clerk authorization code for initiating a debit purchase transaction;

electronically transmitting a transaction request to the host data processor through the telecommunications means of the counter-top terminal for requesting a response of approval or disapproval from the host data processor;

receiving a response from the host computer; and displaying the response from the host data processor for the debit purchase transaction on the counter-top terminal display.

2. The method according to claim 1, further comprising the steps of:

entering sales data by the clerk; and entering confirmation of the sales data from the customer.

3. The method according to claim 1, further comprising the step of printing a debit transaction receipt in response to a print command from the computer.

4. The method according to claim 1, wherein the transaction request transmitting step comprises the step of:

transmitting an activation request for a phone card;

processing a data record for the phone card;

creating a message authorization code;

encrypting phone card data for transmitting to the counter-top terminal;

transmitting the encrypted phone card data to the host data processor;

receiving encrypted approval data from the host data processor;

decrypting the encrypted approval data on the computer for the response displaying step.

5. The method according to claim 1, wherein the transaction request transmitting step comprises the steps of:

requesting a credit increase for use with the debit card;

receiving a credit amount from customer;

entering the credit amount into the computer using the keypad;

transmitting credit amount data representative of the credit amount received to the host data processor;

increasing the value of the debit card by the credit amount.

6. The method according to claim 1, wherein the card reading step comprises the step of swiping the card through the card reader.

7. The method according to claim 1, further comprising the step of providing a remote keyboard communicating with the terminal unit, and wherein the transaction data entering step includes the step of entering data through the keyboard.

8. The method according to claim 7, wherein the remote keyboard comprises a hand-held styled keyboard.

9. The method according to claim 1, wherein the host data processor includes one of a credit authorization provider, a phone card provider, and a telephone switch.

10. A method for processing debit purchase transactions, the method comprising the steps of:

providing a counter-top terminal having telecommunications means operable with a computer, a keypad for data entry to the computer, an alphanumeric display responsive to the computer, and a card reader communicating with the computer;

entering transaction data for a debit purchase transaction to the computer through keypad data entry;

reading a debit styled card through the card reader for transferring card data to the computer;

entering a customer authorization code for authorizing access to a customer data base of the host data processor;

entering a clerk authorization code for initiating a debit purchase transaction;

communicating with a host data processor through the telecommunications means of the counter-top terminal for requesting authorization of the debit purchase transaction;

requesting authorization of the debit purchase transaction from the host data processor; and receiving the authorization.

11. The method according to claim 10, further comprising the step of modifying a purchasing value of the card in response to card use.

12. The method according to claim 10, further comprising the step of displaying the authorization from the host data processor for the debit purchase transaction on the counter-top terminal display.

13. The method according to claim 10, wherein the transaction data entering step comprises the steps of:

entering sales data by the clerk; and entering confirmation of the sales data by the customer.

14. The method according to claim 10, further comprising the step of printing a debit transaction receipt in response to a print command from the computer.

15. The method according to claim 10, wherein the transaction request transmitting step comprises the step of:

requesting a phone card;

processing a data record for the phone card;

creating a message authorization code;

encrypting phone card data for transmitting from the counter-top terminal;

transmitting the encrypted phone card data to the host data processor;

receiving encrypted approval data from the host data processor;

decrypting the encrypted approval data on the computer for the response displaying step.

16. The method according to claim 10, wherein the transaction request transmitting step comprises the steps of:

entering a credit amount into the computer using the keypad;

transmitting the credit amount received to the host data processor; and increasing the value of the debit card by the credit amount.

17. The method according to claim 10, wherein the card reading step comprises the step of swiping the card through the card reader.

18. The method according to claim 10, further comprising the step of providing a remote keyboard communicating with the terminal unit, and wherein the transaction data entering step includes the step of entering data through the keyboard.

19. The method according to claim 10, wherein the host data processor includes one of a credit authorization provider, a phone card provider, and a telephone switch.

20. A method for processing debit purchase transactions, the method comprising the steps of:

providing a counter-top terminal having telecommunications means operable with a computer, at least one keypad for data entry to the computer, a display responsive to the computer, and a card reader communicating with the computer for modifying purchasing value of a card in response to card use;

entering sales transaction data to the computer through keypad data entry by a clerk;

entering confirmation of the sales transaction data by a customer;

reading a debit styled card through the card reader for providing card data to the computer;

entering an authorization code through the keypad for having the computer initiate communication with a host data processor;

electronically transmitting a transaction request to the host data processor through the telecommunications means of the counter-top terminal for requesting a response of approval or disapproval from the host data processor;

receiving a response from the host computer; and displaying the response from the host data processor for the debit purchase transaction on the counter-top terminal display.

21. The method according to claim 20, wherein the authorization code entering step comprises the steps of:

entering a customer authorization code for authorizing access to a customer data base of a host processor; and entering a clerk authorization code for initiating a debit purchase transaction.

22. The method according to claim 20, further comprising the step of printing a debit transaction receipt in response to a print command from the computer.

23. The method according to claim 20, wherein the transaction request transmitting step comprises the step of:

transmitting an activation request for a phone card;

processing a data record for the phone card;

creating a message authorization code;

encrypting phone card data for transmitting to the counter-top terminal;

transmitting the encrypted phone card data to the host data processor;

receiving encrypted approval data from the host data processor;

decrypting the encrypted approval data on the computer for the response displaying step.

24. The method according to claim 20, wherein the transaction request transmitting step comprises the steps of:

requesting a credit increase for use with the debit card;

receiving a credit amount from customer;

entering the credit amount into the computer using the keypad;

transmitting credit amount data representative of the credit amount received to the host data processor;

increasing the value of the debit card by the credit amount.

25. The method according to claim 20, wherein the card reading step comprises the step of swiping the card through the card reader.

26. The method according to claim 20, further comprising the step of providing a remote keyboard communicating with the terminal unit, and wherein the transaction data entering step includes the step of entering data through the keyboard.

27. The method according to claim 20, wherein the remote keyboard comprises a hand held keyboard.

28. The method according to claim 20, wherein the host data processor includes one of a credit authorization provider, a phone card provider, and a telephone switch.

29. A method for processing debit purchase transactions, the method comprising the steps of:

providing a counter-top terminal having telecommunications means operable with a computer, a keypad for data entry to the computer, an alphanumeric display responsive to the computer, and a card reader communicating with the computer;

entering sales transaction data by a clerk for a debit purchase transaction to the computer through keypad data entry;

entering confirmation of the sales transaction data by a customer;

reading a debit styled card through the card reader for transferring card data to the computer;

entering an authorization code through the keypad for having the computer initiate communication with a host data processor;

communicating with a host data processor through the telecommunications means of the counter-top terminal for requesting authorization of a debit purchase transaction;

requesting authorization of the debit purchase transaction from the host data processor; and receiving the authorization.

30. The method according to claim 29, further comprising the step of modifying a purchasing value of the card in response to card use.

31. The method according to claim 29, further comprising the step of displaying the authorization from the host data processor for the debit purchase transaction on the counter-top terminal display.

32. The method according to claim 29, wherein the authorization code entering step comprises the steps of:

entering a customer authorization code for authorizing access to a customer data base of the host processor; and entering a clerk authorization code for initiating the debit purchase transaction.

33. The method according to claim 29, further comprising the step of printing a debit transaction receipt in response to a print command from the computer.

34. The method according to claim 29, wherein the transaction request transmitting step comprises the step of:

requesting a phone card;

processing a data record for the phone card;

creating a message authorization code;

encrypting phone card data for transmitting from the counter-top terminal;

transmitting the encrypted phone card data to the host data processor;

receiving encrypted approval data from the host data processor;

decrypting the encrypted approval data on the computer for the response displaying step.

35. The method according to claim 29, wherein the transaction request transmitting step comprises the steps of:

entering a credit amount into the computer using the keypad;

transmitting the credit amount received to the host data processor; and increasing the value of the debit card by the credit amount.

36. The method according to claim 29, wherein the card reading step comprises the step of swiping the card through the card reader.

37. The method according to claim 29, further comprising the step of providing a remote keyboard communicating with the terminal unit, and wherein the transaction data entering step includes the step of entering data through the keyboard.

38. The method according to claim 29, wherein the host data processor includes one of a credit authorization provider, a phone card provider, and a telephone switch.

* * * * *

US006032859C1

(12) EX PARTE REEXAMINATION CERTIFICATE (7789th)
United States Patent
Muehlberger et al.

(10) Number: US 6,032,859 C1
(45) Certificate Issued: Oct. 5, 2010

(54) METHOD FOR PROCESSING DEBIT PURCHASE TRANSACTIONS USING A COUNTER-TOP TERMINAL SYSTEM (75) Inventors: Karl Muehlberger, Lakeland, FL (US); Michael Hughes, St. Petersburg Beach, FL (US)

(73) Assignee: Card Activation Technologies, Inc., Wilmington, DE (US)

Reexamination Request:
No. 90/009,459, Apr. 30, 2009

Reexamination Certificate for:
Patent No.: 6,032,859
Issued: Mar. 7, 2000
Appl. No.: 08/929,993
Filed: Sep. 15, 1997

Related U.S. Application Data (60) Provisional application No. 60/025,281, filed on Sep. 18, 1996, and provisional application No. 60/033,153, filed on Dec. 13, 1996.

(51) Int. Cl.
G06Q 20/00 (2006.01)
G07F 7/02 (2006.01)
G07F 7/00 (2006.01)
G07F 7/08 (2006.01)

(52) U.S. Cl. .................. 235/449; 235/379; 235/380
(58) Field of Classification Search .............. 235/449
See application file for complete search history.

(56) References Cited

U.S. PATENT DOCUMENTS

| 3,752,904 | A | 8/1973 | Waterbury |
| 4,439,636 | A | 3/1984 | Newkirk et al. |
| 4,449,040 | A | 5/1984 | Matsuoka et al. |
| 4,532,416 | A | 7/1985 | Berstein |
| 4,678,895 | A | 7/1987 | Tateisi et al. |
| 4,722,054 | A | 1/1988 | Yorozu et al. |
| 4,727,243 | A | 2/1988 | Savar |
| 4,750,201 | A | 6/1988 | Hodgson et al. |
| 4,797,540 | A | 1/1989 | Kimizu |
| 4,827,113 | A | 5/1989 | Rikuna |
| 4,868,900 | A | 9/1989 | McGuire |
| 4,968,873 | A | 11/1990 | Dethloff et al. |
| 5,012,077 | A | 4/1991 | Takano |
| 5,048,085 | A | 9/1991 | Abraham et al. |
| 5,050,207 | A | 9/1991 | Hitchcock |
| 5,148,481 | A | 9/1992 | Abraham et al. |
| 5,278,752 | A | 1/1994 | Narita et al. |
| 5,416,306 | A | 5/1995 | Imahata |

(Continued)

FOREIGN PATENT DOCUMENTS

EP 0619565 10/1994

(Continued)

OTHER PUBLICATIONS

MicroTrax Ltd. Omni 490M (and 490ML) Operation Manual for Integrated and Non–Integrated Configurations, 1994, 60 pgs.

(Continued)

Primary Examiner—James Menefee (57) ABSTRACT

A customer operated counter-top terminal system activates various debit card transactions, provides secure communications with a host computer database, and issues a decrypted authorization code to the customer. The system consists of a main terminal unit with an alphanumeric display. The main terminal unit carries a CPU, memory, and all interface devices, including a keypad for the entry of Personal Identification Numbers (PIN), plus programmable function keys and a swipe reader for reading various cards. The main terminal unit further includes a printer for printing receipts for use by a customer and retailer. The system also includes a remote hand-held keyboard having a keyboard display, typically to be held by a clerk for providing a level of privacy desirable to the customer. The system permits processing services to merchants, allowing them to accept all credit and ATM cards for the purchase of goods or services provided by their establishment, thus providing the advantage of a guaranteed payment for the merchant.

U.S. PATENT DOCUMENTS

| | | | |
|---|---|---|---|
| 5,448,044 | A | 9/1995 | Price et al. |
| 5,550,358 | A | 8/1996 | Tait |
| 5,577,109 | A | 11/1996 | Stimson et al. |
| 5,577,121 | A | 11/1996 | Davis et al. |
| 5,661,254 | A | 8/1997 | Steuer et al. |
| 5,696,908 | A | 12/1997 | Muehlberger et al. |
| 5,732,136 | A | 3/1998 | Murphree et al. |
| 5,897,620 | A | 4/1999 | Walker et al. |
| 5,933,812 | A | 8/1999 | Meyer et al. |
| 6,041,308 | A | 3/2000 | Walker et al. |
| 6,065,679 | A | 5/2000 | Levie |
| 6,112,191 | A | 8/2000 | Burke |
| 6,253,998 | B1 | 7/2001 | Ziarno |
| 7,451,920 | B1 | 11/2008 | Rose |

FOREIGN PATENT DOCUMENTS

| | | |
|---|---|---|
| EP | 0348932 | 5/1995 |
| WO | WO 86/02757 | 5/1986 |
| WO | WO 86/07647 | 12/1986 |
| WO | WO 88/03297 | 5/1988 |
| WO | WO 89/08899 | 9/1989 |
| WO | WO 91/09370 | 6/1991 |
| WO | WO 93/09515 | 5/1993 |
| WO | WO 94/10649 | 5/1994 |
| WO | WO 94/28498 | 12/1994 |
| WO | WO 95/03570 | 2/1995 |
| WO | WO 97/46986 | 12/1997 |

OTHER PUBLICATIONS

MicroTrax Electronic Payment Systems: The MicroTrax Pinstripe Lane Equipment Users Guide, MicroTrax Ltd., Newport Beach, CA, 1991, 54 pgs.

IBM 4680–4690 Supermarket Application—Electronic Funds Transfer Feature Enhancement: User's Guide, IBM Corp., Research Triangle Park, NC, Sep. 1995, 318 pgs.

IBM 4680 General Sales Application Electronic Funds Transfer User's Guide, IBM Corp., Research Triangle Park, NC, Dec. 1990, 260 pgs.

IBM 4680 General Sales Application Electronics Funds Transfer User's Guide, IBM Corp., Research Triangle Park, NC, Mar. 1991, 263 pgs.

IBM 4680 General Application: Guide to Operations, Reseach Triangle Park, NC, Jun. 1991, 429 pgs.

"A Birthday Card That Pays Off", Gary Krino and Lisa Lytle, The Orange County Register, Jul. 19, 1996, 2 pgs.

"Alternative to Cash Gains Ground", Bruce Cohen, The Financial Post, Apr. 22, 1994, 2 pgs.

"Bank of Boulder POS Debit Solution at the Table Now in Beta; First Bank to Certifiy IVI Spirit C2000 on MAPP(R)", Business Wire, Aug. 3, 1994, 1 pg.

Microtrax Ltd., *PC Electronic Payment Systems Reference Manual*, 1995 (381 pgs).

John P. Caskey and Gordon H. Selton, Jr., *Is the Debit Card Revolution Finally Here?*, Federal Reserve Bank of Kansas City, *Economic Review*, Fourth Quarter 1994, pp. 70–95, vol. 79 #4 (17 pgs).

"Neiman Marcus Offers Electronic Gift Certifcate", Card Fax, Jan. 23, 1995, 1 pg.

"Neiman Marcus to Launch NM Express Automated Gift Card", PR Newswire, Nov. 22, 1994, 1 pg.

NM Express Card Advertisement, The New Yorker, Dec. 12, 1994, 3 pgs.

Service Mark Registration No. 1,981,044 for "NM Express Card", registered Jun. 18, 1996, 1 pg.

Omni 480/490 Programmer's Guide, VeriFone Part No. 12924—Revision A, Manual Revision 1.0, Oct. 1993, 228 pgs.

"One Company's Diversification Shakes Up Peripherals Market:", Chain Store Age, Jun. 1996, 3 pgs.

"Portable POS Debit Terminals Mean Greater Convenience", Michael O'Keefe Bank Systems & Technology, Nov. 1994, 2 pgs.

"POS Terminal Can Handle Direct Debits", ABA Banking Journal, Sep. 1984, 2 pgs.

Racal Corp. Advertisement, "POS Terminal Eliminates Credit Card Vouchers", ABA Banking Journal, Nov. 1985, 2 pgs.

"The Changing World of Financial Services", Joan C. Szabo, Nation's Business, Oct. 1994, 7 pgs.

VeriFone Everest Advertisement, Stores, May 1995, 2 pgs.

VeriFone Folio(TM) Brings Credit and Debit Card Payment to the Restaurant Table, PR Newswire, May 16, 1994, 3 pgs.

"VeriFone Introduces Everest (TM) Customer Activated Payment System to Multi–Lane Retail Market", David B. Barnes, PR Newswire, Feb. 20, 1995, 2 pgs.

"VeriFone Introduces Pinpad (TM) 1000 to Point–of–Sale Debit Market", M2 Presswire, Apr. 21, 1995, 1 pg.

VeriFone TCL Terminal Control Language programmer's Manual, VeriFone Part No. 00368–01, Revision G, Manual Revision 8.0, Aug. 1992, 362 pgs.

VeriFone Tranz 330 Reference Manual, VeriFone Part No. 00483—Revision D, manual Revision 3.01, Apr. 1990, 144 pgs.

"Business Promote Services to Customers Day In and Day Out", Laura Castaneda, The Dallas Morning News, Nov. 26, 1994, 3 pgs.

"Checkout Tech", Margaret Mannix, U.S. News & World Report, Feb. 27, 1995, 6 pgs.

"Credit Terminals to be Used at Canadian Liquor Outlets", Card News, Jan. 23, 1995, 1 pg.

"Debit Card Popularity on the Rise", Chain Store Age Executive, Jan. 1994, 1 pg.

"Debit Goes to Dinner", Credit Card Management, New York, Oct. 1994, 2 pgs.

"Down and Dirty in Deep Ellum", Alan Peppard, The Dallas Morning News, Dec. 3, 1994, 2 pgs.

Everest Reference Manual, VeriFone Part No. 25399, Revision A, Manual Revision 1.0, Jul. 1995, 66 pgs.

"Express Cards and Trains", Chain Store Age Executive Edition, Jan. 1995, 1 pg.

"Goodnight Amy, Meg, Beth and Jo", Suzanne Brown, Rocky Mountain News, Dec. 8, 1994, 1 pg.

"Here Comes the Debit Card", Robert J. Klein, D&B Reports, Jul./Aug. 1990, 2 pgs.

Hypersom S7C Advertisement, Chain Store Age, Sep. 1995, 4 pgs.

Hypercom S7SC Advertisement, Chain Store Age, Feb. 1996, 2 pgs.

IBM 4680–4690 Advanced Payment System for Chain Drug Sales Application User's Guide, Nov. 1996, 256 pgs.

IBM 4680–4690 Advanced Payment System for General Sales Application User's Guide, Jul. 1996, 248 pgs.

IBM 4680–4690 Advanced Payment System for Supermarket Application User's Guide, Sep. 1996, 222 pgs.

"Keep an Eye on Your Credit Card", Linda A. Fox, The Toronto Sun, Aug. 9, 1996, 1 pg.

Mobile Stations to Permit Use of Bank Cards, Rudolph A. Pyatt, Jr., The Washington Post, Oct. 25, 1983, 1 pg.

NCR 4430–5000 MSR/PIN User's Guide, 1994, 265 pgs.

"Neiman Marcus: High–Tech for the Holidays", ADWEEK, Dec. 5, 1994, 1 pg.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 21 and 32 are cancelled.

Claims 20 and 29 are determined to be patentable as amended.

Claims 22, 25-28, 30, 31, 33 and 36-38, dependent on an amended claim, are determined to be patentable.

Claims 1-19, 23, 24, 34 and 35 were not reexamined.

20. A method for processing debit purchase transactions, the method comprising the steps of:
- providing a counter-top terminal having telecommunications means operable with a computer, at least one keypad for data entry to the computer, a display responsive to the computer, and a card reader communicating with the computer for modifying purchasing value of a card in response to card use;
- entering sales transaction data to the computer through keypad data entry by a clerk;
- entering confirmation of the sales transaction data by a customer;
- reading a debit styled card through the card reader for providing card data to the computer;
- entering an authorization code through the keypad for having the computer initiate communication with a host data processor;
- *entering a customer authorization code for authorizing access to a customer data base of a host processor;*
- *entering a clerk authorization code for initiating a debit purchase transaction;*
- electronically transmitting a transaction request to the host data processor through the telecommunications means of the counter-top terminal for requesting a response of approval or disapproval from the host data processor;
- receiving a response from the host computer; and
- displaying the response from the host data processor for the debit purchase transaction on the counter-top terminal display.

29. A method for processing debit purchase transactions, the method comprising the steps of:
- providing a counter-top terminal having telecommunications means operable with a computer, a keypad for data entry to the computer, an alphanumeric display responsive to the computer, and a card reader communicating with the computer;
- entering sales transaction data by a clerk for a debit purchase transaction to the computer through keypad data entry;
- entering confirmation of the sales transaction data by a customer; reading a debit styled card through the card reader for transferring card data to the computer;
- entering an authorization code through the keypad for having the computer initiate communication with a host data processor;
- *entering a customer authorization code for authorizing access to a customer data base of a host processor;*
- *entering a clerk authorization code for initiating a debit purchase transaction;*
- communicating with a host data processor through the telecommunications means of the counter-top terminal for requesting authorization of a debit purchase transaction;
- requesting authorization of the debit purchase transaction from the host data processor; and
- receiving the authorization.

* * * * *

(12) EX PARTE REEXAMINATION CERTIFICATE (9562nd)
United States Patent
Muehlberger et al.

(10) Number: US 6,032,859 C2
(45) Certificate Issued: Mar. 13, 2013

(54) METHOD FOR PROCESSING DEBIT PURCHASE TRANSACTIONS USING A COUNTER-TOP TERMINAL SYSTEM

(75) Inventors: Karl Muehlberger, Lakeland, FL (US); Michael Hughes, St. Petersburg Beach, FL (US)

(73) Assignee: Volterra Semiconductor Corporation, Fremont, CA (US)

Reexamination Request:
No. 90/011,004, Oct. 1, 2010

No. 90/011,146, Nov. 24, 2010

Reexamination Certificate for:
Patent No.: 6,032,859
Issued: Mar. 7, 2000
Appl. No.: 08/929,993
Filed: Sep. 15, 1997

Reexamination Certificate C1 6,032,859 issued Oct. 5, 2010

Related U.S. Application Data

(60) Provisional application No. 60/025,281, filed on Sep. 18, 1996, provisional application No. 60/033,153, filed on Dec. 13, 1996.

(51) Int. Cl.
*G06Q 20/00* (2006.01)
*G07F 7/02* (2006.01)
*G07F 7/00* (2006.01)
*G07F 7/08* (2006.01)

(52) U.S. Cl. .................... 235/449; 235/379; 235/380

(58) Field of Classification Search .................. 235/449; 323/282
See application file for complete search history.

(56) References Cited

To view the complete listing of prior art documents cited during the proceedings for Reexamination Control Numbers 90/011,004 and 90/011,146, please refer to the USPTO's public Patent Application Information Retrieval (PAIR) system under the Display References tab.

*Primary Examiner* — Samuel Rimell (57) ABSTRACT

A customer operated counter-top terminal system activates various debit card transactions, provides secure communications with a host computer database, and issues a decrypted authorization code to the customer. The system consists of a main terminal unit with an alphanumeric display. The main terminal unit carries a CPU, memory, and all interface devices, including a keypad for the entry of Personal Identification Numbers (PIN), plus programmable function keys and a swipe reader for reading various cards. The main terminal unit further includes a printer for printing receipts for use by a customer and retailer. The system also includes a remote hand-held keyboard having a keyboard display, typically to be held by a clerk for providing a level of privacy desirable to the customer. The system permits processing services to merchants, allowing them to accept all credit and ATM cards for the purchase of goods or services provided by their establishment, thus providing the advantage of a guaranteed payment for the merchant.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 21 and 32 were previously cancelled.
Claims 1-20, 22-31 and 33-38 are cancelled.

\* \* \* \* \*